United States Patent
Sun et al.

(10) Patent No.: US 10,386,264 B2
(45) Date of Patent: Aug. 20, 2019

(54) SELF-POWERED MULTI-FUNCTIONAL STRUCTURAL HEALTH MONITORING SENSOR

(71) Applicant: Sikorsky Aircraft Corporation, Stratford, CT (US)

(72) Inventors: Fanping Sun, Glastonbury, CT (US); Zaffir A. Chaudhry, South Glastonbury, CT (US); Avinash Sarlashkar, Pittsford, NY (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/549,251

(22) PCT Filed: Nov. 24, 2015

(86) PCT No.: PCT/US2015/062340
§ 371 (c)(1),
(2) Date: Aug. 7, 2017

(87) PCT Pub. No.: WO2016/126306
PCT Pub. Date: Aug. 11, 2016

(65) Prior Publication Data
US 2018/0095001 A1    Apr. 5, 2018

Related U.S. Application Data
(60) Provisional application No. 62/112,464, filed on Feb. 5, 2015.

(51) Int. Cl.
*G01M 5/00* (2006.01)
*G01L 1/26* (2006.01)
(Continued)

(52) U.S. Cl.
CPC ............... *G01M 5/005* (2013.01); *G01L 1/26* (2013.01); *G01M 5/0033* (2013.01);
(Continued)

(58) Field of Classification Search
CPC .... G07C 5/085; G01M 5/005; G01M 5/0058; G01M 5/0066; G01M 7/00; G01L 1/26
(Continued)

(56) References Cited

U.S. PATENT DOCUMENTS

| | | | |
|---|---|---|---|
| 8,635,916 B1 | 1/2014 | Loverich et al. | |
| 2004/0078662 A1* | 4/2004 | Hamel | B60C 23/0411 714/22 |
| 2004/0150529 A1 | 8/2004 | Benoit et al. | |
| 2007/0114422 A1 | 5/2007 | Berkcan et al. | |
| 2008/0036617 A1* | 2/2008 | Arms | B64C 27/006 340/679 |

(Continued)

OTHER PUBLICATIONS

PCT International Search Report and Written Opinion; International Application No. PCT/US2015/062340; International Filing Date: Nov. 24, 2015; dated Mar. 24, 2016; pp. 1-12.
(Continued)

*Primary Examiner* — Max H Noori
(74) *Attorney, Agent, or Firm* — Cantor Colburn LLP (57) ABSTRACT

A structural health monitoring module including a sensor attached to a surface of a structural member configured to convert a strain on the structural member to electric energy, a gate operationally connected to the sensor and configured to control distribution of the energy, an energy storage device operationally connected to the gate and configured to receive the energy from the sensor, a data collection device configured to receive the energy from the sensor and at least one of process and record data related to the received energy, and a data transmission device configured to wirelessly transmit data from the data collection device to an external
(Continued)

receiver. The gate is configured to direct a portion of the energy to the storage device in a storage state and configured to direct a portion of the energy to the data collection device when in load monitoring or interrogation states.

14 Claims, 5 Drawing Sheets

(51) Int. Cl.
*G01M 7/00* (2006.01)
*G07C 5/08* (2006.01)

(52) U.S. Cl.
CPC ........ *G01M 5/0058* (2013.01); *G01M 5/0066* (2013.01); *G01M 7/00* (2013.01); *G07C 5/085* (2013.01)

(58) Field of Classification Search
USPC .......................................................... 73/768
See application file for complete search history.

(56) References Cited

U.S. PATENT DOCUMENTS

| | | | |
|---|---|---|---|
| 2010/0161244 A1* | 6/2010 | Ghoshal | G01N 29/14 702/35 |
| 2012/0068827 A1 | 3/2012 | Yi et al. | |
| 2013/0307703 A1 | 11/2013 | Foucher et al. | |
| 2015/0253209 A1* | 9/2015 | Chaudhry | G01L 1/16 73/862.625 |
| 2016/0003708 A1* | 1/2016 | D'Orlando | G01M 13/00 702/34 |
| 2017/0331844 A1* | 11/2017 | Harrigan | H04L 63/1425 |

OTHER PUBLICATIONS

The extended European search report; Application No. 15881393.1; dated Oct. 15, 2018; 9 pages.

* cited by examiner

FIG. 5

SELF-POWERED MULTI-FUNCTIONAL STRUCTURAL HEALTH MONITORING SENSOR

CROSS-REFERENCE TO RELATED APPLICATIONS

This application is a National Stage application of PCT/US2015/062340, filed on Nov. 24, 2015, which claims priority from U.S. Provisional Application Ser. No. 62/112,464, filed on Feb. 5, 2015, the contents of which are incorporated by reference in their entirety herein.

STATEMENT REGARDING FEDERALLY SPONSORED RESEARCH AND DEVELOPMENT

This invention was made with government support with the United States Army under Contract No. W911W6-13-2-0006. The government therefore has certain rights in this invention.

BACKGROUND OF THE INVENTION

The subject matter disclosed herein generally relates to structural health monitoring systems, and more particularly to self-powered multi-functional health monitoring sensors.

Vibration-based structural health monitoring has been increasingly employed in high speed rotational machineries for both operational and health condition monitoring, including damage detection. Vibration-based detection of faulty conditions of the machines or structures has been repeatedly demonstrated with conventional accelerometers successfully.

Current damage detection sensors may rely on piezoelectric materials such as piezoelectric transducers (PZTs) bonded to a structure. For example, a first PZT is excited at high frequencies. A second, nearby PZT sensor measures a response of the structure due to excitation by the first PZT sensor. Any structural damage present in the path between the two PZT actuator/sensors is indicated by changes in the frequency response function ("FRF") relative to its baseline. In this approach, the PZT actuator/sensor is used solely for the purpose of excitation and damage detection at very high operating frequencies.

The PZTs are connected, electrically, to signal conditioning and/or data collection and data processing or similar devices, which require power sources. Traditional structural health monitoring systems employing PZTs thus include external or separate power sources and associated wiring connecting the PZTs to the external power sources. Further, communication lines and/or wiring may add to the bulk of the system.

BRIEF DESCRIPTION OF THE INVENTION

According to one embodiment, a structural health monitoring module is provided. The module includes a sensor, a gate, an energy storage device, a data collection device, and a data transmission device. The sensor is configured to attach to a surface of a structural member, and is further configured to convert a strain on the surface of the structural member to electric energy. The gate is operationally connected to the sensor and configured to control distribution of the electric energy. An energy storage device is operationally connected to the gate and configured to receive electric energy from the sensor. The data collection device is configured to receive the electric energy from the sensor and at least one of process and record data related to the received energy. The data transmission device is configured to wirelessly transmit data from the data collection device to an external receiver. The gate is further configured to direct a portion of the electric energy to the energy storage device in a storage state and configured to direct a portion of the electric energy to the data collection device when in a load monitoring state or an interrogation state.

In addition to one or more of the features described above, or as an alternative, further embodiments may include, wherein the data collection device and the data transmission device are configured as an integral unit.

In addition to one or more of the features described above, or as an alternative, further embodiments may include, wherein, when in the storage state, the portion of the electric energy directed to the energy storage device comprises substantially all of the electric energy.

In addition to one or more of the features described above, or as an alternative, further embodiments may include, wherein, when in the load monitoring state, the portion of the electric energy directed to the data collection device comprises substantially all of the electric energy.

In addition to one or more of the features described above, or as an alternative, further embodiments may include further configuration to perform active interrogation of the structural member.

In addition to one or more of the features described above, or as an alternative, further embodiments may include, wherein the gate includes an interrogating state wherein the gate is configured to direct a portion of the electric energy to perform active interrogation.

In addition to one or more of the features described above, or as an alternative, further embodiments may include, wherein, when in the interrogating state, the gate directs a second portion of the electric energy to at least one of the data collection device and the data transmission device.

In addition to one or more of the features described above, or as an alternative, further embodiments may include, wherein the energy storage device is configured to supply power to at least one of the data collection device and the data transmission device.

In addition to one or more of the features described above, or as an alternative, further embodiments may include, wherein the sensor is a piezoelectric sensor.

In addition to one or more of the features described above, or as an alternative, further embodiments may include, wherein the gate is an intelligent device manager.

In addition to one or more of the features described above, or as an alternative, further embodiments may include, wherein the electric energy is a voltage generated by the sensor.

According to another embodiment, a method of monitoring the structural health of a structural member is provided. The method includes converting a strain on a surface of a structural member to electric energy with a sensor. The method further includes, in an energy storage state, distributing, through a gate, a portion of the electric energy to an energy storage device and storing the electric energy. Further, the method includes, in a load monitoring state, distributing, through the gate, a portion of the electric energy to a data collection device, at least one of processing and storing data related to the electric energy at the data collection device, and transmitting data of the data collection device to a remote receiver.

In addition to one or more of the features described above, or as an alternative, further embodiments may include, wherein, in an interrogating state, the method further comprises actively interrogating the structural member with the sensor.

In addition to one or more of the features described above, or as an alternative, further embodiments may include powering at least one of the data collection device and the data transmission device with the energy stored in the energy storage device.

In addition to one or more of the features described above, or as an alternative, further embodiments may include, wherein the gate comprises an intelligent device manager and the state is selected by the gate.

Technical features of the invention include providing a self-sufficient and self-powered structural health monitoring module. Other features include use of a PZTs energy harvesting function from the vibration of a structure or machine that is monitored by the PZT.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

It is noted that various connections are set forth between elements in the following description and in the drawings. It is noted that these connections in general, unless specified otherwise, may be direct or indirect and that this specification is not intended to be limiting in this respect. As such, a coupling between entities may refer to either a direct or an indirect connection.

In the aircraft or aerospace industry, where the PZT transducer sensors and/or accelerometers may be used for structural health and damage monitoring, the use of onboard power sources and associated wiring increases the weight of the monitoring device and system and further limits the possible locations of the sensors. Thus, wireless data transmission may be beneficial for cost and weight effective implementation in aerospace applications. Even with known techniques for wireless sensing, a challenge with wireless structural health monitoring is that an externally powered system does not constitute a practical solution due to, for example, durability and/or maintenance requirements.

Exemplary embodiments of apparatuses, systems, and methods are described herein for using PZT sensors, or similar sensors, to sense load in addition to performing a damage detection function. In some embodiments, a monitoring of a structure may be performed in a passive manner, e.g., the monitoring might not require an external or extra source of excitement to be applied to the structure. In some embodiments, structural health of joints or other structural members may be monitored based on sensor outputs across the joint or structural member. In some embodiments, absolute load magnitude monitoring may be provided. In some embodiments, loads may be monitored during one or more states or regimes of operation. In some embodiments, power self-generated by one or more sensors may be collected or aggregated and used to collect or transmit data or information. Further, in some embodiments, the self-generated power may be used to excite the structure for the purpose of health monitoring.

In exemplary embodiments of the invention, one or more conventional piezoelectric-based damage sensors may be used as load/strain and load-path sensors. However, those of skill in the art will appreciate that other types of sensors may be used without departing from the scope of the invention. For example, other types of sensors/devices that can convert kinetic energy to electric energy may be used without departing from the scope of the invention. In alternative embodiments, the sensors may be configured as acoustic sensors that monitor for acoustic emission and transmission.

Actual operational structural loading may be utilized to produce an easily measurable output proportional to the underlying strain in a structural member. This output, because it is derived from operation-level structural loading such as, e.g., full flight-level loads, may be most sensitive to load path alteration due to damage. Load path direction may also be sensitive to damage, and the sensor(s) can be configured to provide load path information. By comparing two sensor outputs across a structural member, such as a joint, the structural health, and any damage, can be monitored. Further, the sensors can be used for absolute load magnitude monitoring.

In some embodiments, a large voltage output proportional to a strain in an underlying structure may be obtained without a need for any external excitation. Such an output may be based on, for example, a PZT material's intrinsic strain-electric field coupling, although other types of sensors may be used. This alleviates the need for well controlled power supplies and precision sensing-circuits (like a Wheatstone bridge) required for strain-gages. The high sensitivity voltage output also simplifies downstream load/strain path sensing electronics.

Figure 1:
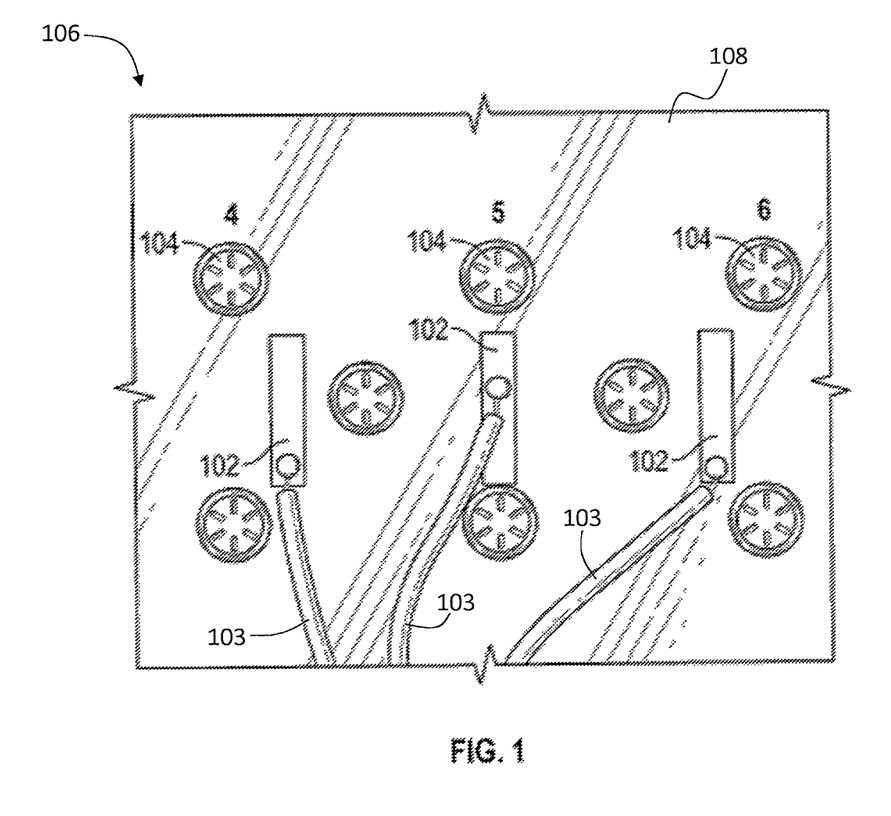
FIG. 1 illustrates an exemplary sensor system in accordance with one or more embodiments.

Referring to FIG. 1. 1, an exemplary embodiment of a sensor system is shown. The system of FIG. 1 is an exemplary configuration of a plurality of sensors attached to a structural member. As shown, a plurality of sensors 102 are attached to a structural member 106 between or proximal to fasteners 104. Each sensor 102 is electrically connected to a data collection device, not shown, by one or more wires 103. Wires 103 may be configured to transmit or carry electrical impulses generated by the sensors 102 as a result of strain that is imparted to the sensors 102. The same sensor set can also be used for actively measuring the dynamic or static strain generated by work load imposed on the structure at typically low frequencies for the load or load path monitoring. In such configurations, a single sensor may be able to carry out two functions when performing health monitoring.

In this exemplary embodiment, the sensors 102 are configured to be removably or fixedly attached to the structural member 106. The sensors 102 are made of one or more materials, such as lead zirconium titanate, and are configured as devices that convert strain energy into electric energy. The structural member includes one or more plates 108. Fasteners 104, such as HI-LOK® rivets, are used to connect two plates 108 of the structural member 106 through rivet holes and are used in connection with the sensors 102. Although exemplary material types are provided above, these are merely for illustrative and explanatory purposes; other material types may be used in various embodiments without departing from the scope of the invention.

Figure 2A:
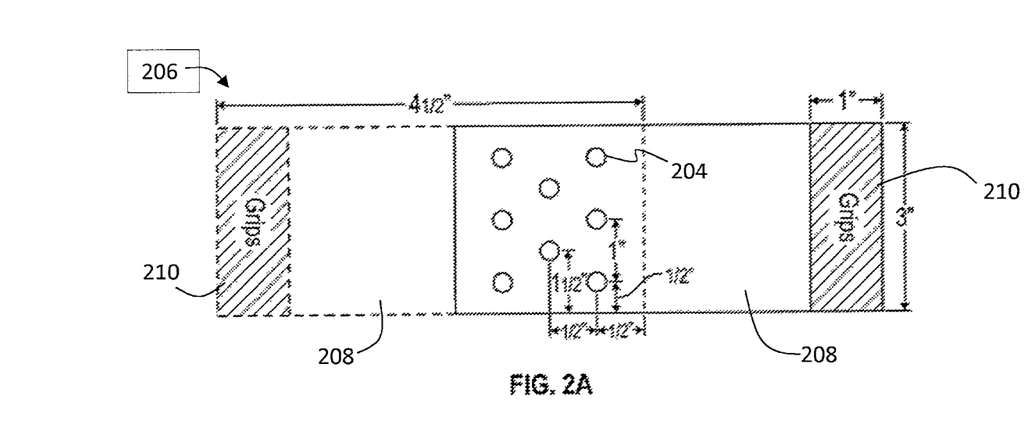
FIG. 2A illustrates a structural member subject to testing in accordance with an exemplary sensor system.
Figure 2B:
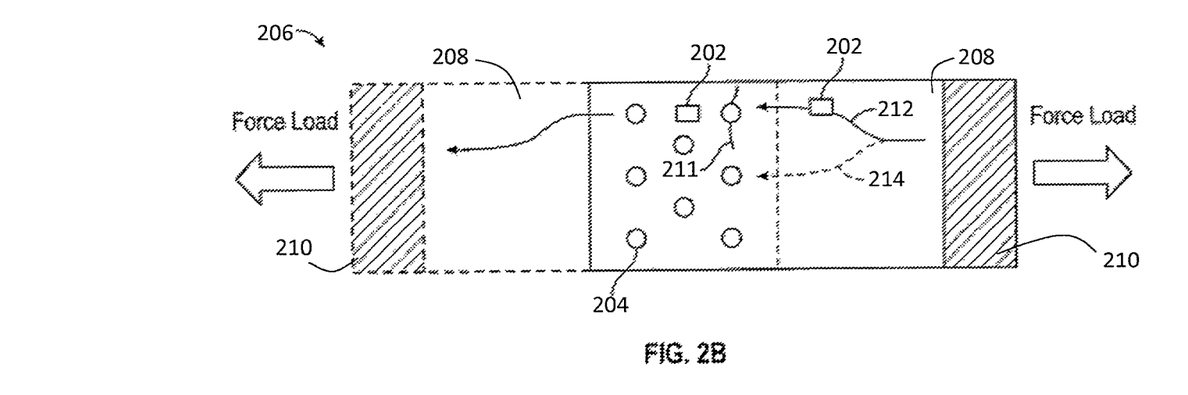
FIG. 2B illustrates the sensor configuration and loading of the structural member shown in FIG. 2A.
Figure 3:
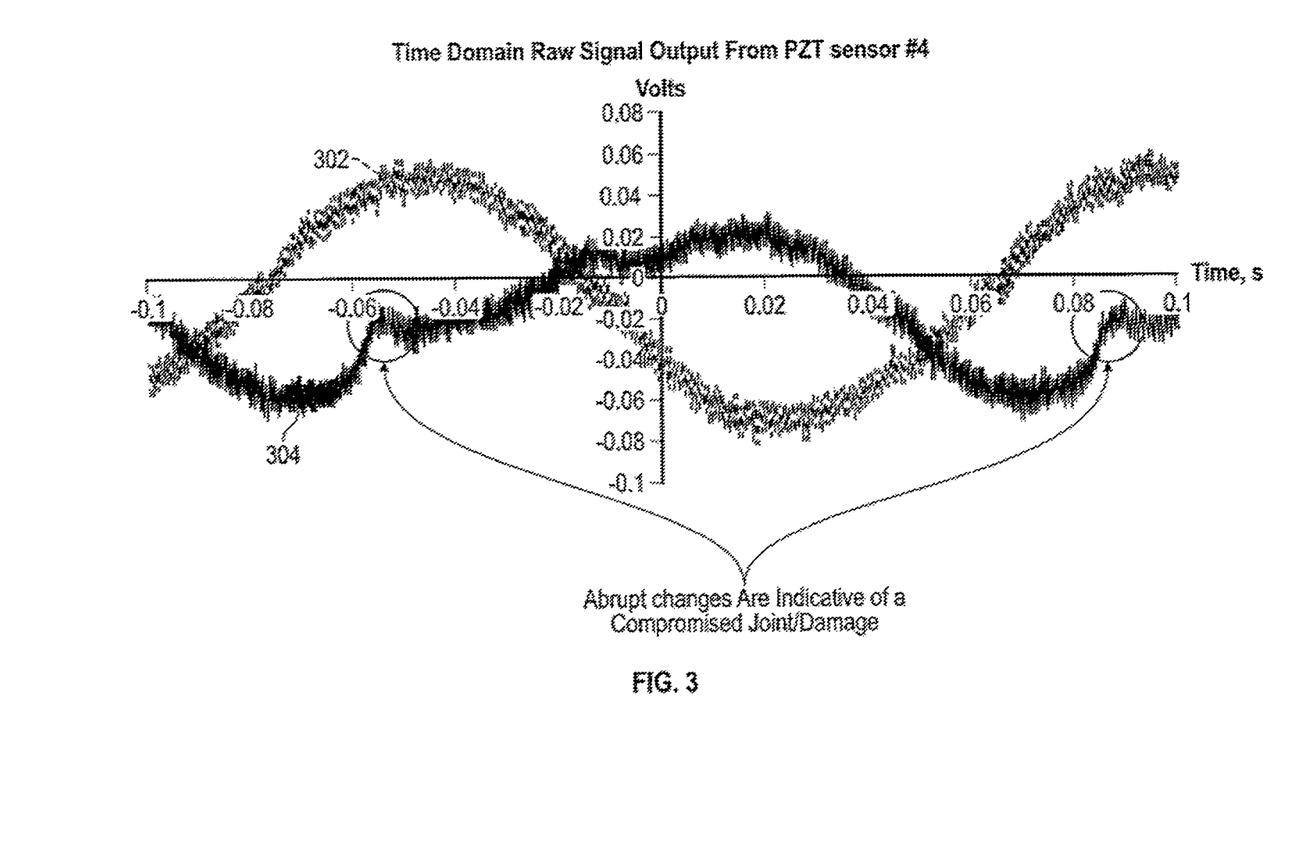
FIG. 3 illustrates exemplary waveforms as sensed by sensors in the configuration shown in FIG. 2B.

Turning now to FIGS. 2A and 2B, a configuration of a real-world example that was subject to testing with an application of 0-1000 pounds at 7 Hz and a stress of 0-5000 psi is shown. Features of FIGS. 2A and 2B may be substantially similar to features described above with respect to FIG. 1, and thus similar features will be labeled with similar reference numerals, but preceded by a "2" rather than a "1." FIG. 3 shows the testing data/results of the testing done on the configuration show in FIG. 2B.

FIG. 2A shows a structural member 206 with a plurality of fasteners 204 and details exemplary dimensions of the structural member 206, as described above, but without sensors attached thereto, FIG. 2B is shown for explanatory and clarity purpose with respect to the testing set up. The structural member 206 is formed of two plates 208 that are connected to each other by fasteners 204. During testing, a respective grip 210 was connected to each of the plates 208 of the structural member 206. The grips 210 were configured to pull outward or away from each other to stress the structural member 206 and the points at the fasteners 204.

Referring to FIG. 2B, the structural member 206 in accordance with the testing and having two sensors 202 attached thereto is shown. The structural member 206, as shown, includes one or more fasteners 204, such as bolts or rivets, which may serve to connect one or more parts or portions of the structural member, such as plates 208. One or more of the plates 208 and the fasteners 204 may experience damage or cracking, as denoted via reference character 211. The structural member 206 may include one or more sensors 202 attached thereto. The sensors 202 may be multi-functional sensors, in the sense that the sensors 202 may be used for purposes of load path monitoring and damage detection, and may be configured similar to the sensors discussed above with respect to FIG. 1.

As shown in FIG. 2B, the grips (grips 210 in FIG. 2A) pull outward as indicated by the force arrows in the figure. The structural member 206 may be associated with a first or original load path 212 when the structural member 206, includes plates 208 and fasteners 204, is free of defects (e.g., when damage/cracking 211 is not present). The structural member 206 may be associated with a second or altered load path 214 based on the damage/cracking 211 being present. The first and second load paths 212 and 214 may carry altered amounts of load, and this difference may be indicative of the existence and/or extent of the damage/cracking 211.

For example, referring to FIG. 3, waveforms associated with testing of a system similar to that of FIGS. 2A and 2B are shown. The waveforms, as shown, correspond to output voltage signals that are proportional to strain rate. A first waveform 302 is shown corresponding to a healthy condition of a structural member. As shown, the waveform 302 is a relatively clean and continuous sinusoid with no abrupt changes. A second waveform 304 is associated with a sensor experiencing an alteration of a load path. The waveform 304 has abrupt changes (e.g., changes in an amount greater than a threshold) indicative of, e.g., fretting and periodic contact such as stick-slip, which may be symptomatic of a compromised structural member or damage thereto. Thus monitoring the waveforms of sensors may be indicative of damage or other structural health compromises of a structural member. Further, as evidenced by the plots of FIG. 3, the output of the sensors is an electrical signal, and thus electrical power can be output by the sensors.

Figure 4:
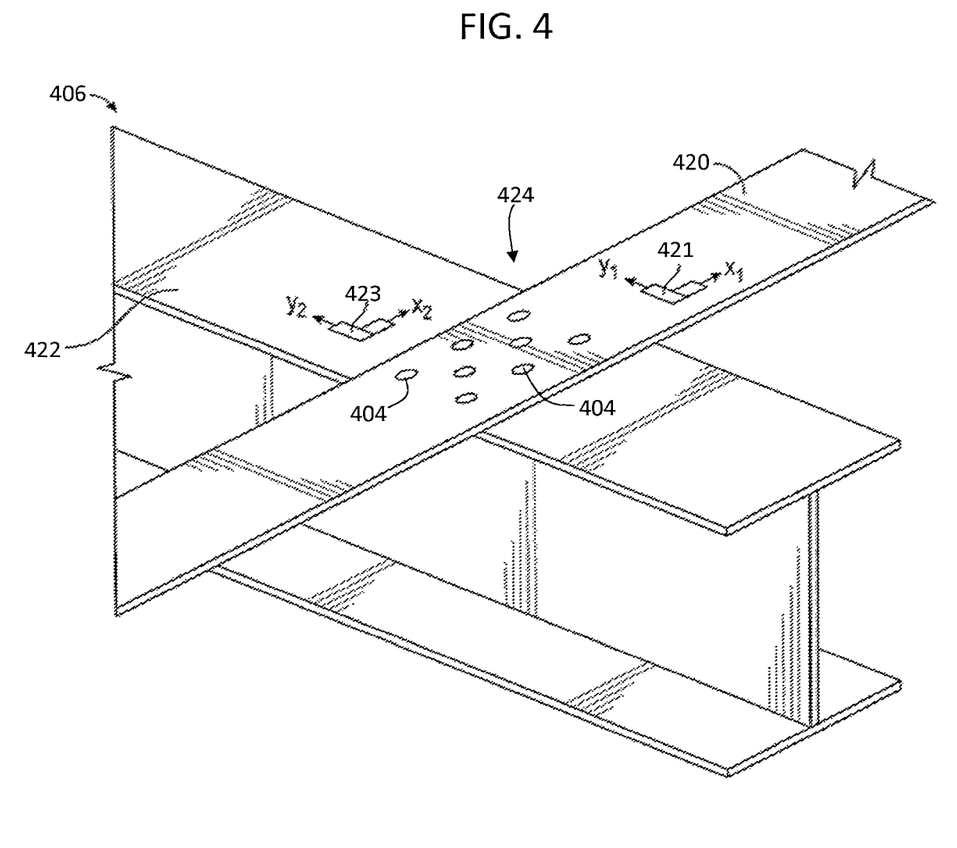
FIG. 4 illustrates an alternative exemplary embodiment and use of a pair of sensors as part of a structural member.

Referring now to FIG. 4, an alternative configuration of a structural member is shown. Features of FIG. 4 may be substantially similar to features described above with respect to FIGS. 1-2B, and thus similar features will be labeled with similar reference numerals, but preceded by a "4" rather than a "1" or a "2." The structural member 406 may be composed of one or more members, such as a first member 420 and a second member 422. The two members 420, 422 may be joined at a joint or similar coupling 424, which may include one or more fasteners 404. The joint 424 may be highly loaded and/or subjected to cyclic loads that may cause fatigue cracking during operation of a vehicle that structural member 406 may be a part of.

As shown in FIG. 4, the first member 420 includes or has a first sensor 421 attached thereto and the second member 422 includes or has a second sensor 423 attached thereto. The sensors 421 and 423 may be multi-functional sensors, such as those described above. The sensors 421, 423 may be configured with two layers each, with the layers oriented along two directions (e.g., X and Y as shown in FIG. 4; $X_1$ and $Y_1$ for first sensor 421, and $X_2$ and $Y_2$ for second sensor 423). A voltage may be generated that is proportional to the surface strain rate on the sensors 421, 423 which is reflective of the surface strain rate at the joint 424. Thus, the sensors 421, 423 may act as strain gages (for dynamic loads), which can be used for load estimation.

Further, the same sensors 421, 423 can be used for active interrogation of critical structural members, such as structural member 406. The active interrogation may be based on one or more high frequency excitations, in a pitch-catch or pulse-echo mode. The sensors 421, 423 may be subjected to a notch filter to identify characteristic dynamic response frequencies to improve signal-to-noise ratio (SNR). The outputs of the sensors 421, 423 may be compared with baseline outputs of the sensors 421, 423, respectively. Any differences in the output relative to the baseline may serve as an indication of unintended flexibility or damage within the structural member 406. Accordingly, the sensors 421, 423 may serve as both a damage sensor and a load sensor, i.e., multi-functional. The sensors 421, 423 may be operationally and/or electrically connected to a controller and/or data collecting device (not shown) configured to monitor the signals generated by the sensors 421, 423.

As described above, principles associated with the sensors may be exploited to monitor the health of a structure or a structural member. The structural member might not be affirmatively or actively excited, and thus interrogating may be required to make observations regarding the health of a structural member. In some embodiments, an external or extra power source might not need to be applied, as is typically the case in connection with the use of a strain gauge, because the sensors may be power-generating sensors, such as PZT, as described above. In some embodiments, electrical energy generated by the sensors may be stored. The stored electricity may be used as a source of power to transmit (e.g., wirelessly transmit) data or information (e.g., load data or information). Further, the stored electricity may be configured to permit the active interrogation that is permitted by sensors of the present disclosure.

As described above, embodiments of the disclosure may be used to monitor load passing through a structural member. In this respect, one or more sensors may be configured to measure load in absolute terms. The load may be expressed in one or more units (e.g., pounds). Information or data regarding loads may be collected during various state or regimes of operation of the system that employs the sensors. Systems, as used herein, refer to configurations of sensors, wiring, data collection, data transmission, etc., that comprise parts of a structural health monitoring system. Those of skill in the art will appreciate that systems disclosed herein may include various selected components described, and in various configurations, and further may include additional features and/or different numbers of features than that shown and described.

In an example of use in connection with a rotorcraft, loads may be gathered when, e.g., the rotorcraft is on the ground, when the rotorcraft is flying in a steady-state condition (e.g., no changes being made to flight controls), and during a flight maneuver, etc. Load information may be analyzed to determine or detect the safety of a structure. For example, load information may be analyzed to determine whether the structure has any cracks or damage. Further, load information may be analyzed to determine if there is a need to inspect a structure. For example, if the load information indicates a change in an amount greater than a threshold, a targeted inspection of the structure may be scheduled. In this manner, unnecessary or excessive inspections may be minimized or eliminated, while targeted inspections that cater to potential structural health compromises may be enabled. Moreover, in some embodiments, load information may be analyzed in connection with a lifetime associated with a structure such as, e.g., an aircraft. For example, predictive algorithms may be used to predict loads that the aircraft or structure would be subject to during operation (e.g., one or more flight regimes). If the actual loads experienced by the structure or aircraft depart from the predicted loads, the difference may serve to shorten or extend the service life of the structure or aircraft before the structure or aircraft is retired from service. Thus, maintaining a structural health monitoring system is an important aspect to aerospace industries and for other structural health uses.

Figure 5:
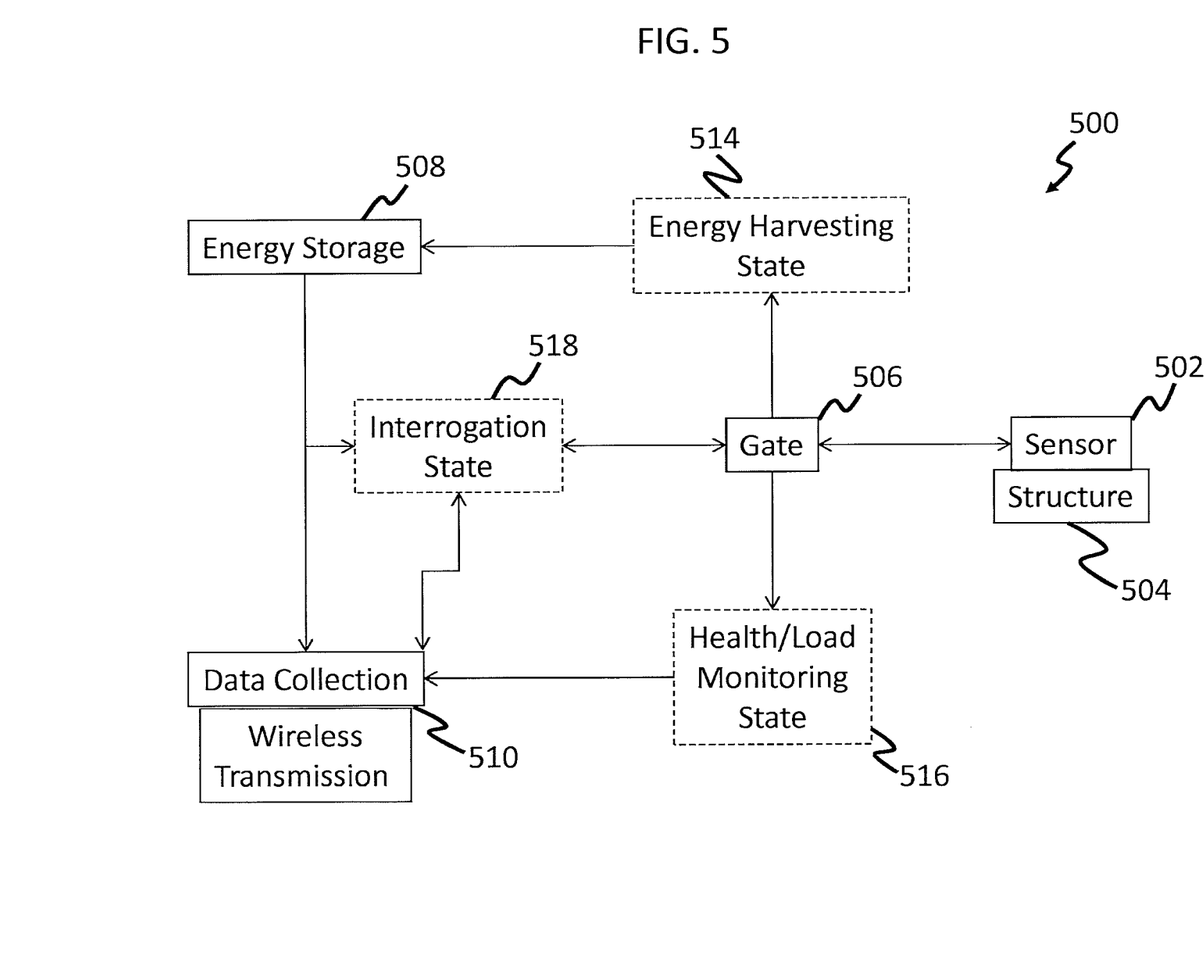
FIG. 5 is a schematic of a stand-alone multifunctional sensor module in accordance with an exemplary embodiment of the invention.

Turning now to FIG. 5, a schematic of a stand-alone multifunctional sensor module or system 500 is shown. Module 500 includes one or more sensors 502 operatively connected to a structure 504 that is to be monitored. The sensor 502 may be configured as described above. In some embodiments the sensor 502 may be configured as a conventional monolithic form or in a more advanced matrix form of Micro Fiber Composite that may have advantages for conformability to complex structural shapes and increased durability during operation.

The module 500 is configured to operate similar to the embodiments described with respect to FIGS. 1-4. In the module 500, the sensor and system is configured to be self-sufficient, with no external power source or controller configured in direct, wired contact with the module. In order to achieve this, the module 500 is configured such that the electric energy generated by the sensor 502 is harnessed, to power various components and/or be stored, when not being used for making sensing or structural health observations (active or passive). In some embodiments, various ones of these features, or all of them, may be operated simultaneously.

A power manager or functional gate 506, such as an intelligent device manager, is operationally and/or electrically connected to the sensor 502. The gate 506 is configured to perform one of at least three functions or configured to operate in one of at least three states. Each of the following three states of the gate 506 relates to distribution of signals/power from the sensor 502. Thus, the gate 506 may be a switch or similar device.

The electric power generated by sensor 502, which may used for sensing and making determinations regarding structural health, as described above, may also be used for powering various electrical devices and/or may be stored. Thus, the gate 506 operates as a power distribution or control device, which may distribute the signal/power from sensor 502 to one or more other components, such as an energy storage device 508 and/or a data collection/transmission device 510. In some embodiments, in each state, the electric energy may be substantially directed to the discussed element, and the remainder of the electric energy may be directed to the other components.

In an energy harvesting state 514, the gate 506 is configured to divert or direct the signals/power from the sensor 502 to the energy storage device 508. The energy storage device 508 may be a device configured to store energy, such as a rechargeable battery or a super capacitor, although other devices may be used without departing from the scope of the invention, and may be configured and selected based on the type and condition of the power generated by the sensor 502. The energy storage device 508 may be electrically and/or operationally connected to the data collection/transmission device 510 and/or the sensor 502. Although shown schematically with direct connection between the energy storage device 508 and the data collection/transmission device 510, those of skill in the art will appreciate that the power supplied by the energy storage device 508 to the data collection/transmission device 510 may be routed or controlled through the gate 506, or other various configurations may be used.

In a load monitoring state 516, the gate 506 is configured to divert or direct the signals/power from the sensor 502 to the data collection/transmission device 510. The load monitoring state 516 may be a form of monitoring as described above with respect to FIGS. 1-4. The data collection/transmission device 510 is configured to record and/or process data related to the state of the structure 504 monitored by the sensor 502. Further, the data collection/transmission device 510 is configured to transmit such data to a remote and/or receiving device (not shown) wirelessly. Thus, data collection/transmission device 510 may include a processor, memory, and/or a wireless transceiver to perform these and/or additional/alternative functions. The data collection/transmission device 510 is configured to provide a wireless data link to controllers or other devices for diagnostics and prognostics using the collected data. The data collection/transmission device 510, shown in FIG. 5 may be configured as two separate devices or a single unitary device. Further, in some embodiments, sensor 502, gate 506, data collection/transmission device 510, and energy storage device 508 may all be configured within a single unit.

In an interrogating state 518 the gate 506 is configured to send the signal/power to and/or receive signal/power from the energy storage device 508. In the interrogating state 518 the module 500 may perform a nondestructive evaluation of the structure 504 for incipient structural damage using the sensor 502. In such embodiments, the module 500 may be configured as an ultrasonic frequency exciter and response receiver. In the interrogating state 518 the power previously generated by the sensor 502 and stored in the energy storage device 508 may be supplied directly to the sensor 502 and/or the data collection/transmission device 510, such that the data collection/transmission device 510 may record or transmit data obtained by the sensor 502.

The gate 506 is configured to switch and/or control signal/power transmission within the module 500. Thus, it will be appreciated by those of skill in the art that the gate

506 may be configured with a computer processing unit and memory for storage and applications and/or programs. The gate 506 may be provided with a means for control logic to be performed by the gate 506. In alternative embodiments, control logic may be stored on the data collection/transmission device 510, and control may be provided by the data collection/transmission device 510, with gate 506 merely acting as a controlled valve or other operable electrical/signal gate. Further, other configurations are possible without departing from the scope of the invention, and thus the shown and described embodiment is merely presented for illustrative and explanatory purposes.

In some embodiments, the module 500 may be a single, self-contained device that does not include any external wiring or components. Thus, in some embodiments, the energy storage 508, the data collection/transmission device 510, and the sensor 502 may all be configured into a single, compact sensing device that is self-sufficient and self-powering/powered.

The power manager or functional gate of embodiments of the invention, may in some example, include the logic control for diverting and directing power to various components, depending on the needs of the health monitoring. The gate may be configured as an intelligent device manager.

Advantageously, multi-functional health monitoring modules in accordance with embodiments of the invention enable self-powered strain/load/vibration sensing for rotational machineries, gearboxes, and bearings, among other devices. In accordance with some embodiments, the wiring-free and battery-free sensor (excluding the power storage device described above) can be either embedded within a structure to be monitored or may be configured as a discrete add-on. Further, in accordance with embodiments of the invention, the self-sufficient capability of the structural health sensing modules disclosed herein reduce weight, cost of installation, and maintenance because external power sources and other components may be eliminated from a larger structural health monitoring system. Advantageously, various applications are enabled with embodiments of the invention, including but not limited to, helicopter main rotor blades and transmissions, tail rotor blades and transmissions, turbofan engines, auxiliary power units (APU), Air Management Systems (AMS), rooftop chillers, compressors, etc.

Moreover, advantageously, in accordance with various embodiments of the invention, an intelligent and/or programmed power gate or controller is provided that enables switching between various states of the module. Further, advantageously, the intelligent controller or gate may be configured to divert or direct power to more than one component at a time. For example, the gate may direct some power to a data collection/transmission device, so that the module may actively interrogate the health of a structural member and further process data associated with the interrogation at the same time. Further, in some embodiments, the gate may be configured to direct power to all three components disclosed herein. Moreover, in some embodiments, other components or features may be included with the structural health monitoring modules and systems as disclosed herein, and the gate may be configured to direct power thereto, as needed.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments and/or features.

For example, although certain numbers of features have been described with respect to a limited number of embodiments, these numbers are not limiting. The embodiments shown and described herein are presented for illustrative and explanatory purposes only. Moreover, as noted, although piezoelectric-based sensors are primarily described herein, other types of sensors now known or to become known that can sense and generate power may be used without departing from the scope of the invention. In some embodiments the signal that is sensed does not need to be the signal that is also used for powering the device. For example, in some embodiments, a PZT sensor may be provided, and adjacent to the PZT sensor may be a PZT power generator device. As such, in some embodiments, power generation (for storage or powering devices) may be provided regardless of which state the gate of the module is in.

Accordingly, the invention is not to be seen as limited by the foregoing description, but is only limited by the scope of the appended claims.

What is claimed is:

1. A structural health monitoring module comprising:
   a sensor configured to attach to a surface of a structural member, the sensor configured to convert a strain on the surface of the structural member to electric energy;
   a gate operationally connected to the sensor and configured to control distribution of the electric energy;
   an energy storage device operationally connected to the gate and configured to receive the electric energy from the sensor via the gate;
   a data collection device operationally connected to the gate and configured to receive the electric energy from the sensor via the gate and at least one of process and record data related to the received energy; and
   a data transmission device configured to wirelessly transmit data from the data collection device to an external receiver,
   wherein the gate is configured to direct a portion of the electric energy from the sensor to the energy storage device when operating in a storage state, to direct a portion of the electric energy from the sensor to the data collection device when operating in a load monitoring state or an interrogation state and to direct a portion of the stored energy from the energy storage device to the sensor when operating in the interrogation state.

2. The module of claim 1, wherein the data collection device and the data transmission device are configured as an integral unit.

3. The module of claim 1, wherein, when in the storage state, the portion of the electric energy directed to the energy storage device comprises substantially all of the electric energy.

4. The module of claim 1, wherein, when in the load monitoring state, the portion of the electric energy directed to the data collection device comprises substantially all of the electric energy.

5. The module of claim 1, wherein the gate is configured to direct a first portion of the stored energy from the energy storage device to the sensor to perform active interrogation.

6. The module of claim 5, wherein, when in the interrogating state, the gate directs a second portion of the stored electric energy from the energy storage device to at least one of the data collection device and the data transmission device.

7. The module of claim 1, wherein the energy storage device is configured to supply power to at least one of the data collection device and the data transmission device.

8. The module of claim 1, wherein the sensor is a piezoelectric sensor.

9. The module of claim 1, wherein the gate is an intelligent device manager.

10. The module of claim 1, wherein the electric energy is a voltage generated by the sensor.

11. A method of monitoring the structural health of a structural member, the method comprising:
converting a strain on a surface of a structural member to electric energy with a sensor;
in an energy storage state:
distributing, through a gate, a portion of the electric energy from the sensor to an energy storage device; and
storing the electric energy;
in a load monitoring state:
distributing, through the gate, a portion of the electric energy from the sensor to a data collection device;
at least one of processing and storing data related to the electric energy at the data collection device;
in an interrogation state:
distributing, through the gate, a portion of the electric energy from the energy storage device to the sensor; and
transmitting data of the data collection device to a remote receiver.

12. The method of claim 11, wherein, in an interrogating state, the method further comprises actively interrogating the structural member with the sensor.

13. The method of claim 11, further comprising powering at least one of the data collection device and the data transmission device with the energy stored in the energy storage device.

14. The method of claim 11, wherein the gate comprises an intelligent device manager and the state is selected by the gate.

* * * * *